(No Model.) 5 Sheets—Sheet 1.
J. W. KENEVEL.
APPARATUS FOR COKING AND DESULFURIZING BITUMINOUS COAL.
No. 596,753. Patented Jan. 4, 1898.

Witnesses:

Inventor:
Jeannot W. Kenevel
By Dyrenforth & Dyrenforth,
Att'ys (No Model.) 5 Sheets—Sheet 4.
J. W. KENEVEL.
APPARATUS FOR COOKING AND DESULFURIZING BITUMINOUS COAL.
No. 596,753. Patented Jan. 4, 1898.

Witnesses:
Chas. E. Gaylord.
Lute J. Alter.

Inventor.
Jeannot W. Kenevel,
By Dyrenforth & Dyrenforth,
Attys.

(No Model.) 5 Sheets—Sheet 5.
J. W. KENEVEL.
APPARATUS FOR COKING AND DESULFURIZING BITUMINOUS COAL.
No. 596,753. Patented Jan. 4, 1898.
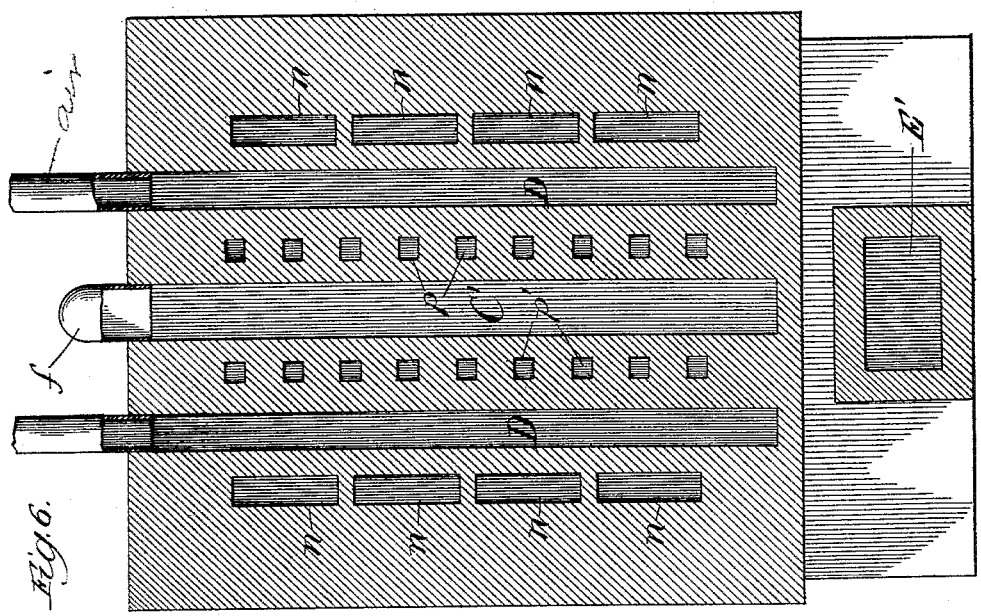
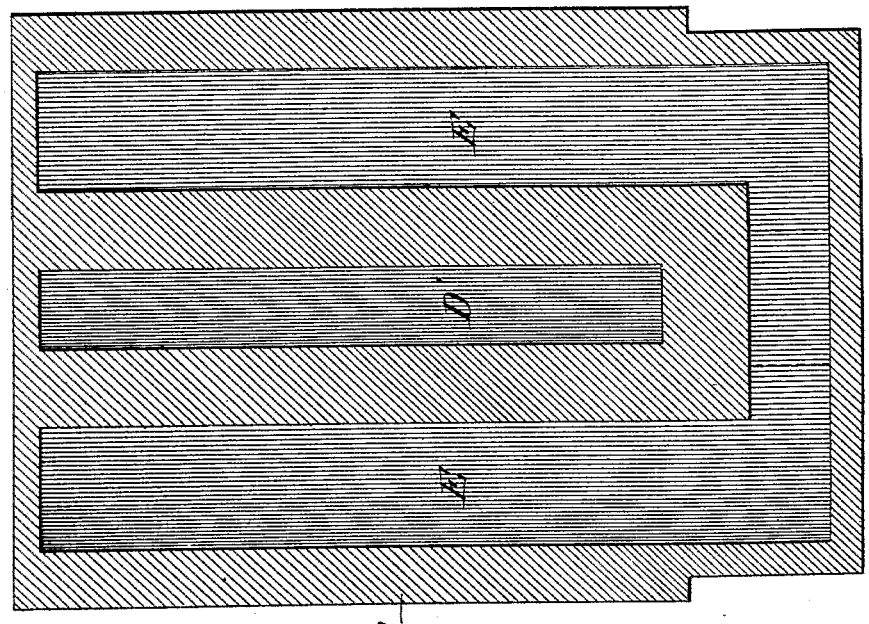
Witnesses:
Inventor,
Jeannot W. Kenevel,
By Dyrenforth & Dyrenforth,
Att'ys

UNITED STATES PATENT OFFICE.

JEANNOT W. KENEVEL, OF CHICAGO, ILLINOIS.

APPARATUS FOR COKING AND DESULFURIZING BITUMINOUS COAL.

SPECIFICATION forming part of Letters Patent No. 596,753, dated January 4, 1898.

Application filed September 8, 1896. Serial No. 605,173. (No model.)

*To all whom it may concern:*

Be it known that I, JEANNOT W. KENEVEL, a citizen of the United States, residing at Chicago, in the county of Cook and State of Illinois, have invented a new and useful Improvement in Apparatus for Coking and Desulfurizing Bituminous Coal, of which the following is a specification.

The object of my invention is to provide an improved construction of apparatus for coking coal, eliminating from it the sulfur it contains, or at least a large proportion thereof, and recovering the eliminated sulfur and other elements and saving them as commercial by-products, and at the same time utilizing the gas evolved by the coking operation for heating the coke-retort and superheating the steam introduced into the coke in the retort for taking out the sulfur.

Figure 1:
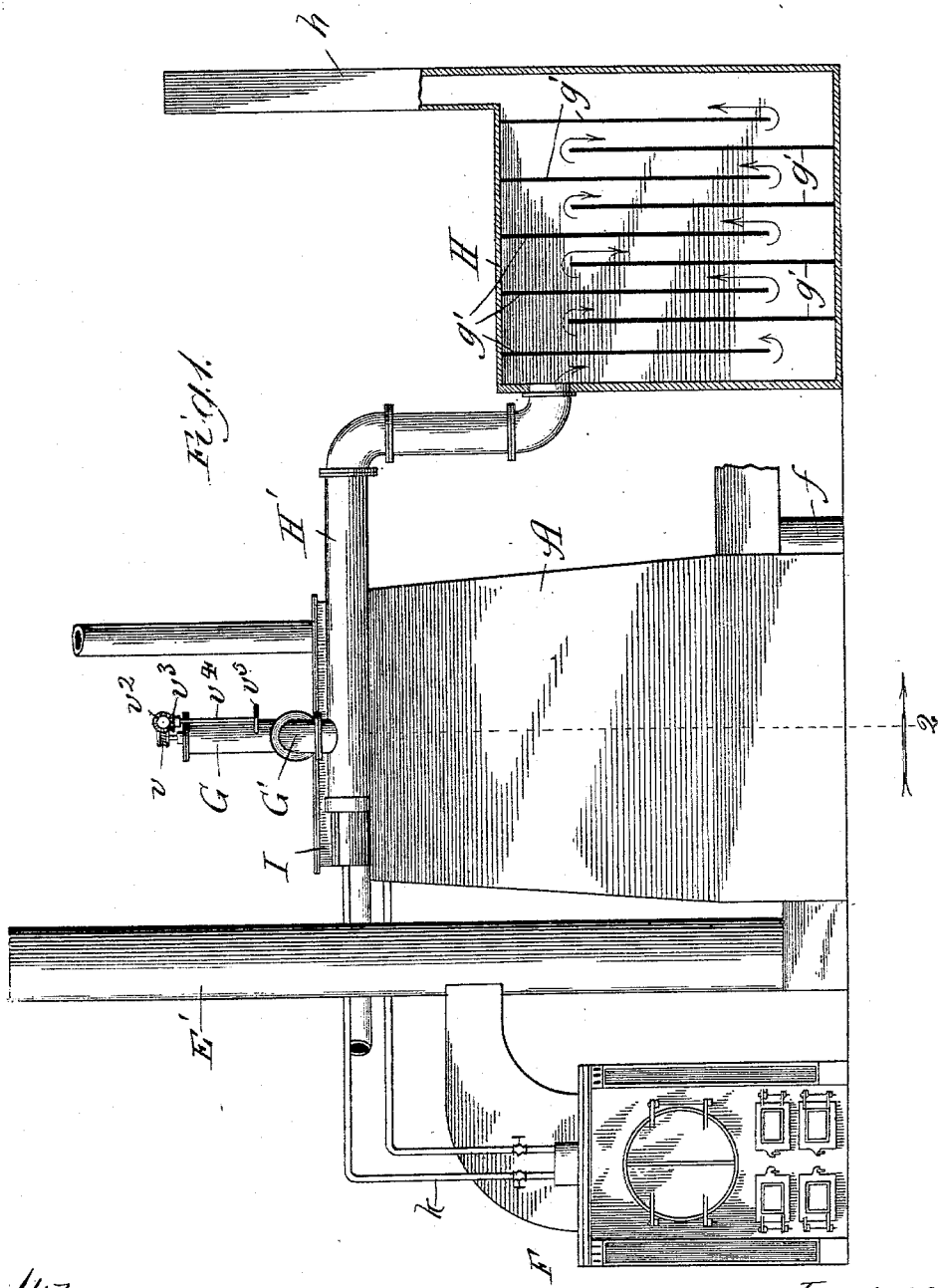
Figure 2:
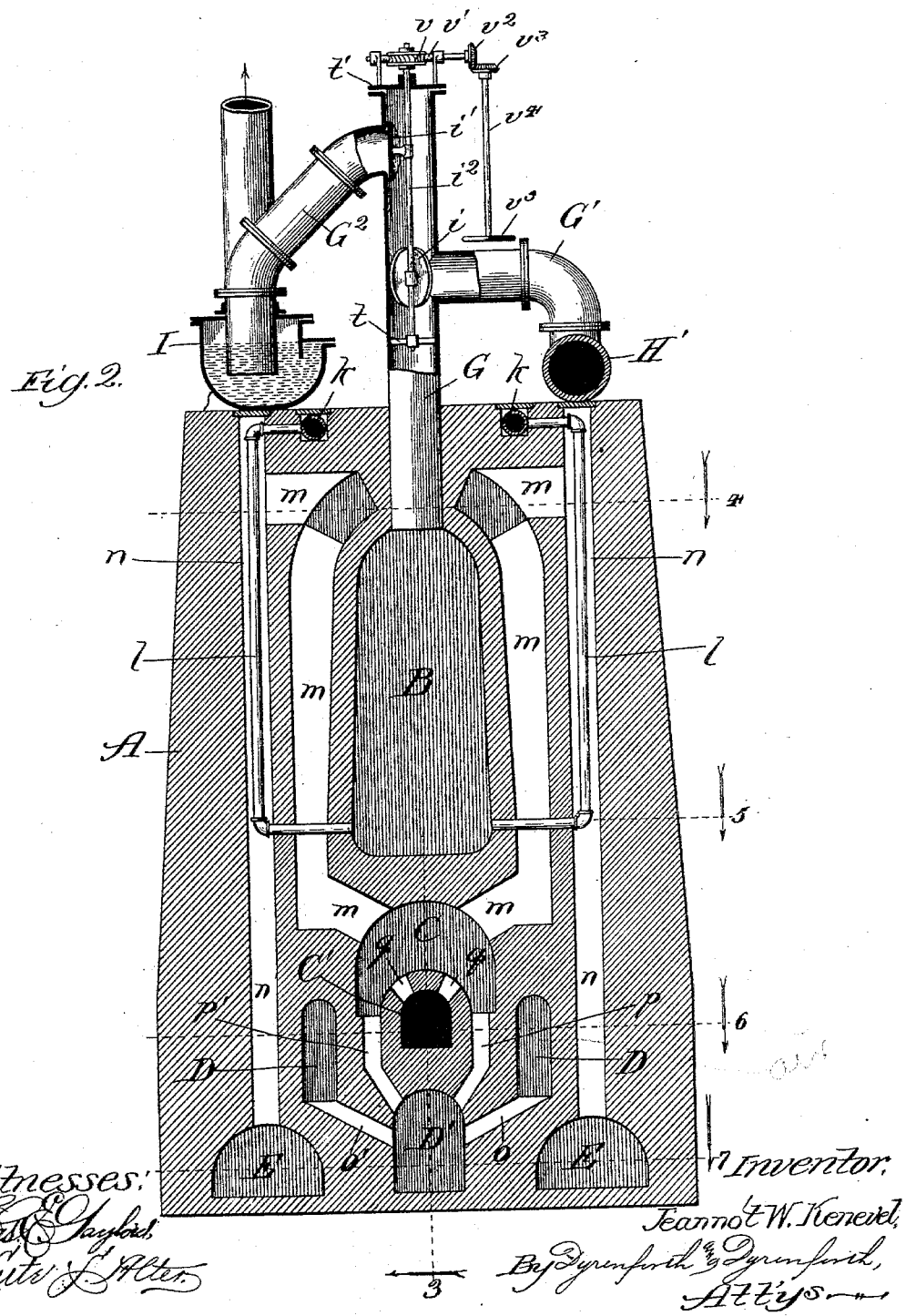
Figure 3:
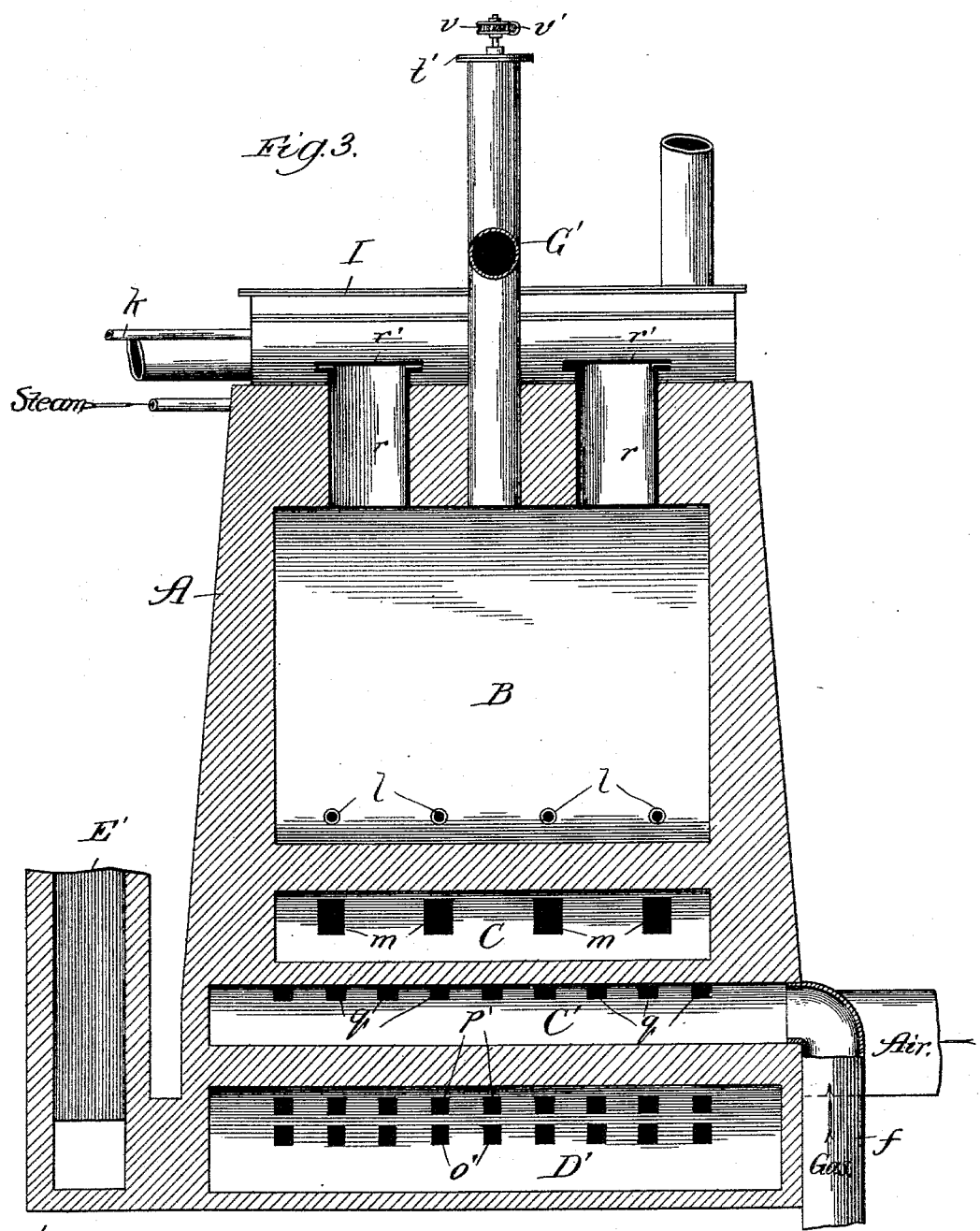
Figure 4:
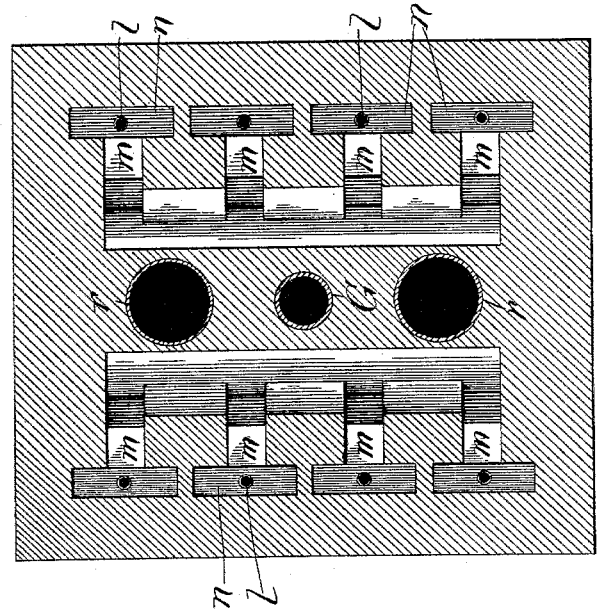
Figure 5:
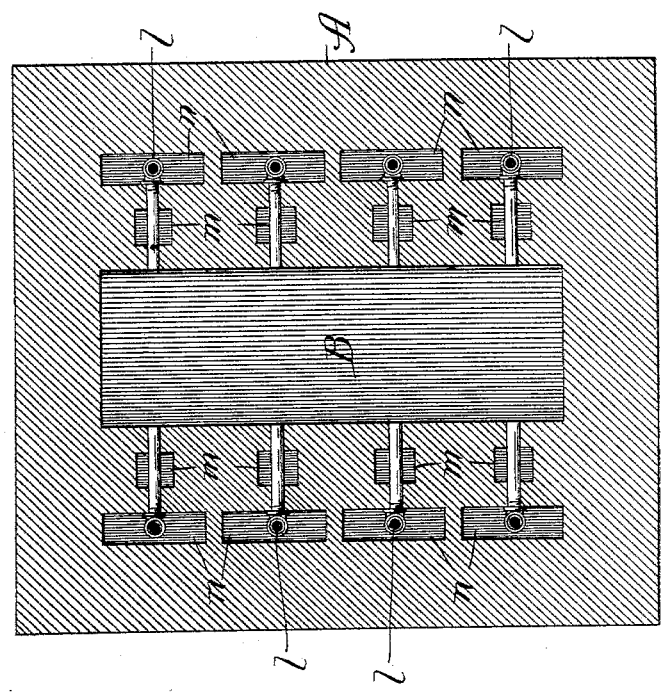

Referring to the accompanying drawings, Figure 1 is a view in elevation, partly sectional, of my improved apparatus in its entirety; Fig. 2, a section taken at the line 2 on Fig. 1, viewed in the direction of the arrow and enlarged; Fig. 3, a section taken at the line 3 on Fig. 2 and viewed in the direction of the arrow; Fig. 4, a section taken at the line 4 on Fig. 2 and viewed in the direction of the arrow; Fig. 5, a section taken at the line 5 on Fig. 2 and viewed in the direction of the arrow; Fig. 6, a section taken at the line 6 on Fig. 2 and viewed in the direction of the arrow, and Fig. 7 a section taken at the line 7 on Fig. 2 and viewed in the direction of the arrow.

A is a furnace structure, preferably of brick and of the oblong form illustrated, tapering at its sides in an upward direction and having built in it the retort B and equipped with other appurtenances hereinafter described, including the coal-charging openings $r\ r$, Fig. 3, in its roof, each provided with a removable cover $r'$. Below the retort and extending throughout the length of its base is a mixing-chamber C, surmounting an arched gas-chamber $C'$, having openings $q$ in its arch, through which it communicates with the mixing-chamber, into which latter, at the opposite sides of its base, there lead the ducts $p$ and $p'$ from a base-flue $D'$, which receives its supply of air through ducts $o$ and $o'$, leading from air-passages D D, Fig. 2, open at their ends to the outer air or receiving their supply from any suitable construction of air-blast apparatus. (Not shown.) Flanking the retort B and extending from the flues E in the base of the structure to the top thereof is the series of passages $n\ n$, Fig. 2, closed at their upper ends and having open communication with the mixing-chamber C through the passages $m\ m$. In the passages $n$ there depend steam-pipes $l$, leading at intervals into the retort B near its base and proceeding from other supply-pipes $k$, which lead from a suitable steam-generator F.

The gas from the retort B discharges through a pipe G, leading upward from the top of the retort B and having a branch $G'$, connected with a flue $H'$, which opens into a chamber H, Fig. 1, and a branch $G^2$, which discharges into a hydraulic main I, from which the gas may be directed through suitable purifying, fixing, and the like apparatus (not shown) to a suitable holder. (Also not shown.)

The mouths of the branches $G'$ and $G^2$ are opened and closed by means of valves $i$ and $i'$, supported on a rod $i^2$, journaled in the pipe G in a bearing $t$ therein and a bearing $t'$ at its upper end, the valves being relatively arranged on the rod to cause each to cover the branch pipe it controls by causing the other to uncover the mouth of the branch pipe controlled by it, and the rod $i^2$ carries at its upper end a worm-wheel $v$, with which a worm-shaft $v'$ is supported to mesh and carries at one end a beveled gear $v^2$, meshing with a similar gear $v^3$ on an operating-rod $v^4$, carrying a hand-wheel $v^5$ and depending in position to be readily accessible from the top of the structure A. By turning the rod $v^4$ the rod $i^2$ may be turned in its bearings to correspondingly turn the valves $i$ and $i'$, and thereby open or close the branch pipe $G'$ and at the same time close or open the branch pipe $G^2$.

The operation of the apparatus is as follows: With the retort B charged with its supply of bituminous coal and the valves $i$ and $i'$, respectively, covering the branch pipe $G'$ and uncovering the branch pipe $G^2$ gas is admitted by way of the pipe $f$ into the gas-chamber C', and air enters the mixing-chamber C from the air-passages D and ducts $o$ and $o'$ by way of the base-flue D' and ducts $p$ and $p'$. Combustion takes place in the chamber C, the products of combustion passing off through the passages $m$, heating the retort, and escaping through the passages $n$ and through the flues E to a stack E', into which said flues discharge. Much of the heat of the products of combustion in the passages $n$ is utilized in superheating the steam in the pipes $l$. The bituminous coal in the retort B is thus reduced to coke, the gases evolved by the coking operation and other products carried by the gases escaping through the branch pipe $G^2$ into the main I, in which the tar deposit from the gas is intercepted, while the gas itself is stored for illuminating or heating purposes, or both, and is utilized to furnish the fuel for the retort B.

After the coal in the retort has been suitably coked the valves $i$ and $i'$ are turned to the relative positions in which they are illustrated in Fig. 2, thereby to close the branch pipe $G^2$ and open the branch pipe G'. Then superheated steam is admitted through the pipes $l$ into the body of hot coke in the retort to separate from the coke its contained sulfur, which is driven off through the pipe G, branch pipe G', and flue H' into the chamber H, the latter being equipped with alternating series $g$ and $g'$ of suitable baffles to intercept the flakes of sulfur, while the gases escape through the vent-pipe $h$.

By the procedure thus described in my improved apparatus I produce from bituminous coal a first-class quality of coke, practically free from sulfur, and recover the sulfur as a valuable by-product.

For the sake of convenience I have shown and described my apparatus as involving only one retort and the appurtenances belonging to it. In practice, however, a series containing ten or more of the retorts and an accordingly large number of the air and gas passages, hydraulic mains, sulfur-flues, and appurtenances belonging to them are provided in connection with the steam-generator, baffle-chamber, and stack, and in the extended arrangement of the apparatus thus referred to all the valve-carrying rods $i^2$ in the several pipes G may be geared together to permit the valves to be set simultaneously from a single point by an arrangement of gearing which forms no part of my invention and may readily be devised by any skilled mechanic, so that it need not be herein shown or described.

What I claim as new, and desire to secure by Letters Patent, is—

1. In combination, a retort for coal in a structure A, a mixing-chamber surmounting and communicating with the gas-chamber below said retort and communicating with an air-supply, a stack, passages for the products of combustion leading through said structure past said retort to the stack, superheated-steam pipes in said passages leading into the retort, a valve-controlled gas-discharge pipe leading from the retort, a sulfur-intercepting chamber and a valve-controlled sulfur-flue connecting the retort with said chamber, substantially as and for the purpose set forth.

2. In combination, a retort for coal in a structure A, a mixing-chamber surmounting and communicating with a gas-chamber below said retort and communicating with an air-supply, a stack, passages for the products of combustion leading through said structure past said retort to the stack, superheated-steam pipes in said passages leading into the retort, a hydraulic main, and a sulfur-intercepting chamber communicating with the retort, and valves for controlling said communication connected together to cause either to be closed by opening the other, substantially as and for the purpose set forth.

3. In combination, in a structure A, a retort for coal, a mixing-chamber C below the retort, a gas-chamber C' below and opening into said mixing-chamber, a base-flue D' connected by ducts $p$ and $p'$ with said mixing-chamber, air-passages connected by ducts $o$ and $o'$ with said base-flue, flues E, passages $m$ and $n$ connecting the mixing-chamber with said flues, and superheated-steam pipes leading through the passages $n$ into said retort, a stack E' into which said flues E discharge, a valve-controlled gas-discharge pipe leading from the retort, a sulfur-intercepting chamber, and a valve-controlled sulfur-flue connecting the retort with said chamber, substantially as and for the purpose set forth.

4. In combination, a retort for coal in a structure A, a mixing-chamber surmounting and communicating with a gas-chamber below said retort and communicating with an air-supply, a stack, passages for the products of combustion leading through said structure past said retort to the stack, superheated-steam pipes in said passages leading into the retort, a hydraulic main and a sulfur-flue surmounting said structure, a sulfur-intercepting chamber, a pipe G leading from the retort and having branches G' and $G^2$ leading, respectively, into said flue and main, and valves $i$ and $i'$ for said branches on a rod $i^2$ rotatably supported in said pipe and provided with means for turning it, substantially as and for the purpose set forth.

5. An apparatus for coking and desulfurizing bituminous coal, comprising, in combination, a structure A containing a retort B, a mixing-chamber C below the retort, a gas-chamber C' below the opening into said mixing-chamber, a base-flue D' connected by ducts $p$ and $p'$ with said mixing-chamber, air-passages D connected by ducts $o$ and $o'$ with said base-flue, flues E, passages $m$ and $n$ connecting the mixing-chamber with said flues, and steam-supply pipes leading through the passages $n$ into said retort, a steam-generator F with which said steam-pipes are connected, a stack E' into which said flues E discharge, a hydraulic main I, a sulfur-flue H', a sulfur-intercepting chamber H into which said sulfur-flue discharges, and a pipe G having valve-controlled branches G' and G² leading, respectively, to said sulfur-flue and hydraulic main, the whole being constructed and arranged to operate substantially as described.

JEANNOT W. KENEVEL.

In presence of—
J. H. LEE,
J. W. DYRENFORTH.